Patented Sept. 22, 1931

1,824,428

UNITED STATES PATENT OFFICE

ALFRED FISHER, OF ROSELLE, NEW JERSEY, ASSIGNOR TO WILLIAM G. ATWOOD, TRUSTEE, OF NEW YORK, N. Y.

EMULSION SUITABLE FOR WOOD PRESERVATION AND PROCESS OF WOOD PRESERVATION AND PRODUCT THEREOF

No Drawing. Application filed July 25, 1928. Serial No. 295,351.

This invention relates to emulsions suitable for wood preservation and process of wood preservation and product thereof and is herein illustrated as carried out with emulsified zinc chloride solutions which may also contain a normally solid insoluble organic compound such as montan wax or gilsonite and which may be normally not wettable by water.

According to the present invention the soluble zinc chloride is carried into the wood in solution in such a way that a part of it at least is protected against being washed out by water, because the zinc chloride lies behind a wall of oil or of the insoluble organic compound.

The organic compound may be normally unwettable and normally solid even at hot summer temperatures, thus preventing the bleeding which has hitherto proved objectionable.

Moreover the emulsions of the following examples are stable for weeks at a time and do not froth even when violently agitated with a bar mixer or with a dover egg beater, thus they are adapted to penetrate the wood without interference by bubbles.

Other features and examples will hereinafter appear.

*Example 1.*—One hundred cc. of California fuel oil were agitated by an electrically driven bar mixer with 5 cc. of a clay suspension made by suspending ten grams of a colloidal plastic clay in 200 cc. of water. During further agitation there was added 100 cc. of a three per cent solution of zinc chloride. The resulting emulsion was stable after standing six weeks, and also after heating to 90° C. This emulsion could be thinned with water and therefore was an emulsion of oil-in-water, the latter being the continuous phase.

Two pieces of short leaf pine about seven inches long, three inches wide and two and one-half inches thick were immersed in this emulsion on a water bath at a temperature of about 90° C. with one end of each piece projecting about a half inch. After eight hours the oil was allowed to cool with the pieces still in. The sap wood piece when split then showed an oil penetration of ¼ to ½ inch from the sides. The heart wood piece showed ⅛ to ¼ inch oil penetration from the sides. The zinc chloride penetration was about the same.

*Example 2.*—An equally stable emulsion was obtained when a ten per cent zinc chloride solution was substituted for the three per cent solution, the procedure being otherwise identical except that Oklahoma oil was used instead of California.

*Example 3.*—Five grams of montan wax were mixed with 95 cc. of California fuel oil on a boiling water bath and with 5 cc. of the clay suspension by agitation with a bar mixer and then was added 100 cc. of a 3% zinc chloride solution, yielding an equally stable emulsion.

*Example 4.*—A stable buttery emulsion was obtained when sixty grams hot montan wax were similarly mixed with 5 cc. of the clay suspension and with 40 cc. hot creosote oil A. R. E. A. Spec. #1, and then with 100 cc. hot 3% zinc chloride solution.

*Example 5.*—A similar emulsion was obtained when forty grams of hot montan wax were similarly mixed with 5 cc. of the clay suspension and with 60 cc. California fuel oil, and then with 100 cc. hot 3% zinc chloride solution.

*Example 6.*—A similar emulsion when cold was obtained when fifteen grams of hot montan wax were similarly mixed with 5 cc. of the clay suspension and with 85 cc. California fuel oil and then with 100 cc. hot 3% zinc chloride solution. This emulsion was thin when hot and was thus tested for absorption in a hot open vessel with a piece of jack pine. The side penetration in two hours was one thirty-second to one sixteenth of an inch of both oil and chloride, and apparently oil and chloride, and apparently of wax also.

*Example 7.*—It was found possible to use other stabilizing means for the emulsion 100 cc. California fuel oil were heated and added to 25 cc. of water on a water bath containing 0.5 grams potassium hydroxide during agitation with the bar mixer. To this was added during continued agitation 100 cc. of hot 3% zinc chloride solution. The resulting emulsion was stable under all the test conditions given above.

It was found that a similar emulsion was obtained when gilsonite was substituted for wax in Example 3. Tested as in Example 6, the penetration of oil and chloride was about the same, and of gilsonite somewhat less than the wax.

Having thus described certain embodiments of my invention, what I claim is:

1. The process of making a wood-preserving emulsion containing a non-crystalline solid water repelling ingredient adapted to guard the outer pores of timber impregnated by the emulsion which consists in emulsifying the ingredient with oil and a stabilizing substance to make an oil-in-water emulsion and admixing a solution of a wood-preserving salt in water.

2. The process of making a wood-preserving emulsion carrying oil and a normally solid non-crystalline organic substance which consists in heating the oil and the organic substance together to commingle them, adding a stabilizing substance adapted to make an oil-in-water emulsion, and admixing an aqueous solution of a wood-preserving salt in water.

3. The process of making a wood-preserving emulsion carrying oil and a wax which consists in heating the oil and the wax together to commingle them, adding an aqueous suspension of a stabilizing substance adapted to make an oil-in-water emulsion, and admixing a solution of a wood-preserving salt in water.

4. The process of making a wood-preserving emulsion of heavy oil and montan wax which consists in heating the oil and the wax together to commingle them, adding a colloidal clay and admixing a solution of a wood-preserving salt in water.

5. The process of making a wood-preserving emulsion of heavy petroleum oil and montan wax which consists in heating the oil and the wax together to commingle them, adding a colloidal clay, and admixing an aqueous solution of zinc chloride.

6. Timber impregnated with montan wax and also with a wood preserving salt lying at least partly within an area having montan wax outside of it.

7. Timber impregnated with montan wax and also with zinc chloride, the chloride lying at least partly behind a water resisting wall of montan wax.

8. The process of preserving timber which consists in heating together oil and a normally solid non-crystalline organic substance to commingle them, adding a stabilizing substance adapted to make an oil-in-water emulsion, adding an aqueous solution of a wood-preserving salt, and causing the timber to absorb the resulting composition to a measurable depth.

9. The process of preserving timber which consists in heating together oil and wax to commingle them, adding an aqueous suspension of a stabilizing substance adapted to make an oil-in-water emulsion, admixing an aqueous solution of a wood-preserving salt, and causing the timber to absorb the resulting composition to a measurable depth.

10. The process of preserving timber which consists in heating together heavy oil and montan wax to commingle them, adding a colloidal clay, admixing an aqueous solution of a wood-preserving salt, and causing the timber to absorb the resulting composition to a measurable depth.

11. The process of preserving timber which consists in heating together heavy petroleum oil and montan wax to commingle them, adding a colloidal clay, admixing an aqueous solution of zinc chloride, and causing the timber to absorb the resulting composition to a measurable depth.

ALFRED FISHER.